United States Patent
Yang et al.

(10) Patent No.: US 7,200,746 B2
(45) Date of Patent: Apr. 3, 2007

(54) DEVICE AND METHOD FOR AUTOMATICALLY DETECTING AND ANNOUNCING ERROR ON BOOTING A MOTHERBOARD

(75) Inventors: Ching-Hsiang Yang, Hsinchu (TW); Hung-Ta Hsu, Hsinchu (TW); Yu-Cheng Liao, Taipei (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 415 days.

(21) Appl. No.: 10/957,645

(22) Filed: Oct. 5, 2004

(65) Prior Publication Data

US 2005/0223294 A1 Oct. 6, 2005

(30) Foreign Application Priority Data

Mar. 26, 2004 (TW) ............................. 93108352 A

(51) Int. Cl.
*G06F 15/177* (2006.01)
(52) U.S. Cl. .................... 713/2; 713/1; 714/25; 714/49
(58) Field of Classification Search ..................... None
See application file for complete search history.

(56) References Cited

U.S. PATENT DOCUMENTS

| | | | |
|---|---|---|---|
| 6,732,265 B2 * | 5/2004 | Esfahani et al. | 713/2 |
| 6,791,572 B1 * | 9/2004 | Cloney et al. | 345/619 |
| 6,807,643 B2 * | 10/2004 | Eckardt et al. | 714/36 |

* cited by examiner

*Primary Examiner*—Thuan Du
(74) *Attorney, Agent, or Firm*—Bacon & Thomas, PLLC

(57) ABSTRACT

A device for automatic error detection on booting a motherboard includes a storage device, and an automatic error detection speech unit. The storage device stores BIOS program code and a system status table for the motherboard, the BIOS program code being executed by a processor when the motherboard is booting, the system status table of the motherboard storing at least one motherboard element status, the motherboard status being updated by the processor when the motherboard is turned on in accordance with current conditions of the booting. The automatic error detection speech unit couples to the storage device for reading the system status table of the motherboard after a predetermined time period of the motherboard being turned on, and playing corresponding speech data in accordance with the motherboard status of the system status table for the motherboard.

16 Claims, 4 Drawing Sheets

| Contents | Meaning |
|---|---|
| 00...000B | Turned off |
| 10...000B | Normal Booting |
| 00...001B | Error 1 |
| 00...010B | Error 2 |
| ... | ... |

FIG. 4

DEVICE AND METHOD FOR AUTOMATICALLY DETECTING AND ANNOUNCING ERROR ON BOOTING A MOTHERBOARD

BACKGROUND OF THE INVENTION

1. Field of the Invention

The present invention relates to a device and method for automatically detecting and announcing error on booting a motherboard and, more particularly, to a speech device and method that performs automatic error detection for every element on the motherboard and announces the detected error.

2. Description of the Related Art

FIG. 1 is a block diagram of the hardware structure of a conventional motherboard for a personal computer. The motherboard comprises a processor 110, a north-bridge 120, a south-bridge 130, an AC97 codec 140, a BIOS 150 and a detection output device 170. The BIOS 150 is connected to the south-bridge 130 via an LPC bus 160. When the motherboard is turned on, the processor 110 executes some diagnostics to decide if elements on the motherboard are functioning correctly. If an element on the motherboard is functioning correctly, the processor 110 sets the corresponding operating parameters for this element; if this element fails the diagnostic, the processor 110 outputs a corresponding code and the detection output device 170 plays a corresponding audio signal or displays a corresponding error message.

The detection output device 170 is used to output a detection result when the motherboard is booting, and whether the detection output device 170 can be working properly or not depends on the processor status at booting procedure. However, the typical motherboard is assembled with different name brands of processors having different clock settings, and so when the processor is malfunctioning or has an incorrect clock setting, the detection output device 170 will not receive an error message from the processor 110. Therefore, the detection output device 170 cannot inform the user of any potential errors.

Therefore, it is desirable to provide a device and method for automatically detecting and announcing error on booting a motherboard to mitigate and/or obviate the aforementioned problems.

SUMMARY OF THE INVENTION

A main objective of the present invention is to provide a device and method for automatically detecting and announcing error on booting a motherboard, which can perform automatic error detection for every element on the motherboard when the motherboard is turned on and announce the detected error.

In accordance with one aspect of the present invention, there is provided a device for automatically detecting and announcing error on booting a motherboard. The device includes a storage device, and an automatic error detection speech unit. The storage device stores BIOS program code and a system status table for the motherboard, the BIOS program code being executed by a processor when the motherboard is booting, the system status table of the motherboard storing at least one motherboard element status, the motherboard status being updated by the processor based on booting the motherboard when the motherboard is turned on. The automatic error detection speech unit couples to the storage device for reading the system status table of the motherboard after a predetermined time period of the motherboard being turned on, and playing corresponding speech data in accordance with the motherboard element status of the system status table for the motherboard.

In accordance with another aspect of the present invention, there is provided a device for automatically detecting and announcing error on booting a motherboard. The device comprises a south-bridge chip, a storage device and an automatic error detection speech unit. The south-bridge chip connects to and uses for managing other peripheral devices of the motherboard. The storage device stores BIOS program code and a system status table for the motherboard, the BIOS program code being executed by the processor when the motherboard is turned on, the system status table of the motherboard storing at least one motherboard element status, the motherboard status being updated by the processor based on booting the motherboard when the motherboard is turned on. The automatic error detection speech unit couples to the storage device for reading the system status table of the motherboard after a predetermined time period of the motherboard being turned on and playing corresponding speech data in accordance with the motherboard element status of the system status table of the motherboard.

In accordance with further aspect of the present invention, there is provided a method for automatically detecting and announcing error on booting a motherboard. The motherboard includes a processor, a storage device and an automatic error detection speech unit. The storage device stores BIOS program code and a system status table of the motherboard. The automatic error detection speech unit couples to the storage device for reading the system status table of the motherboard after a predetermined time period since the motherboard being turned on. The method includes (A) booting the motherboard; (B) determining whether the processor is function normally; and (C) when step (B) determines that the processor is function abnormally, the automatic error detection speech unit plays corresponding speech data in accordance with the motherboard element status based on the system status table of the motherboard.

Other objects, advantages, and novel features of the invention will become more apparent from the following detailed description when taken in conjunction with the accompanying drawings.

BRIEF DESCRIPTION OF THE DRAWINGS

FIG. 4 is a schematic drawing of a system status table in accordance with the present invention.

DETAILED DESCRIPTION OF THE PREFERRED EMBODIMENT

Figure 1:
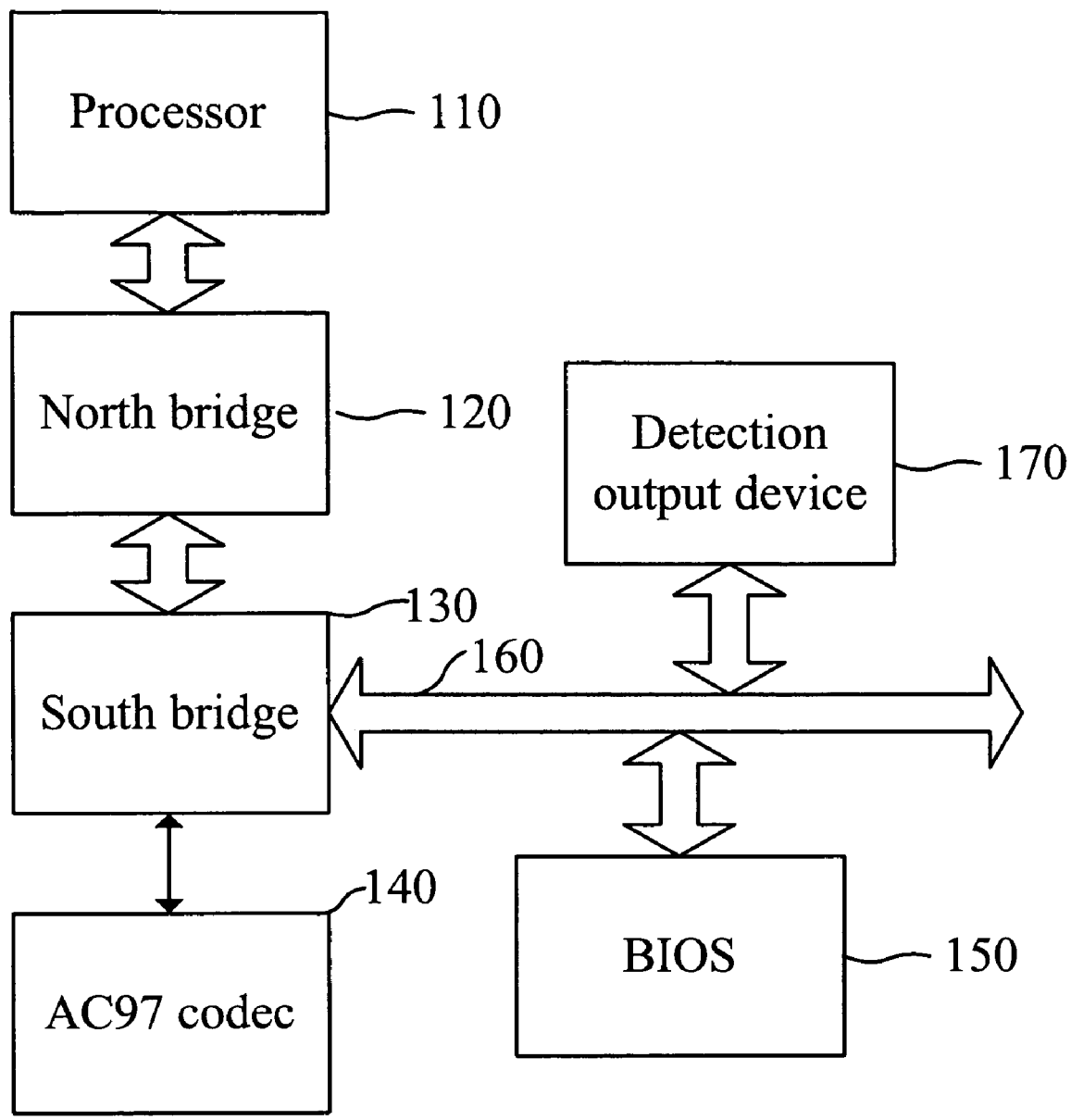
FIG. 1 is a block diagram of the hardware structure of a conventional motherboard for a personal computer.
Figure 2:
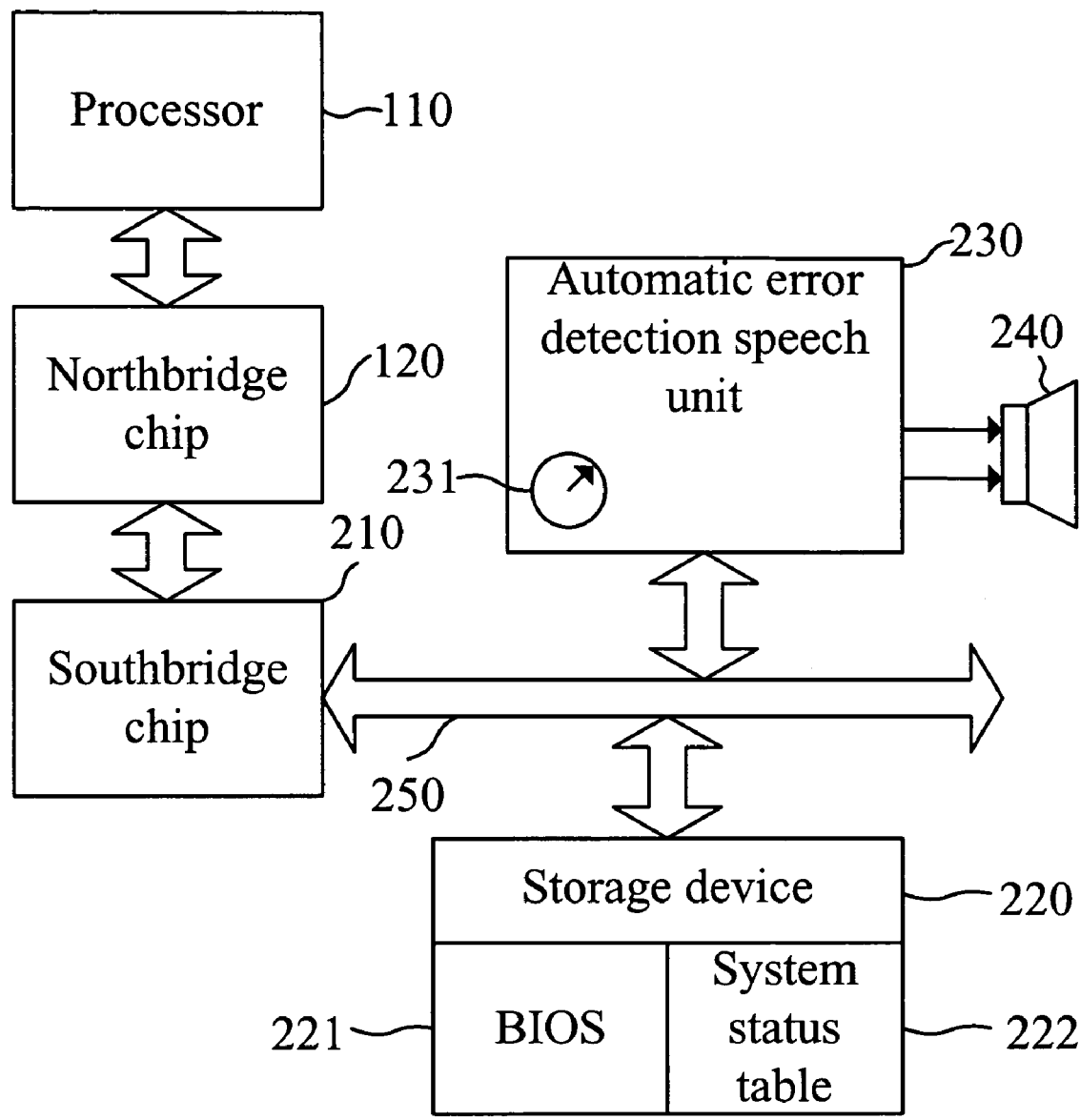
FIG. 2 is a block drawing of a device for automatically detecting and announcing error on booting a motherboard in accordance with the present invention.

Please refer to FIG. 2. FIG. 2 is a block diagram of a device for automatically detecting and announcing error on booting a motherboard in accordance with the present invention. The device comprises a south-bridge 210, a storage device 220, an automatic error detection speech unit 230 and a speaker 240. The storage device 220 is mounted on the motherboard and is used for storing a BIOS program code 221 and a system status table 222 of the motherboard. The BIOS program code 221 is executed by the processor when the motherboard is turned on, and the system status table 222 of the motherboard stores at least one motherboard element status value.

The automatic error detection speech unit 230 has a timer 231 and is coupled to the storage device 220. The automatic error detection speech unit 230 is used for reading the system status table 222 of the motherboard after a predetermined time period has elapsed since the motherboard was turned on, and plays corresponding speech data in accordance with the motherboard status value of the system status table 222 of the motherboard.

In a preferred embodiment of the present invention, the storage device 220 and the automatic error detection speech unit 230 are connected to the south-bridge 210 via the LPC bus 260. The storage device 220 and the automatic error detection speech unit 230 can also be connected to the south-bridge 210 via an I²C bus.

Figure 3:
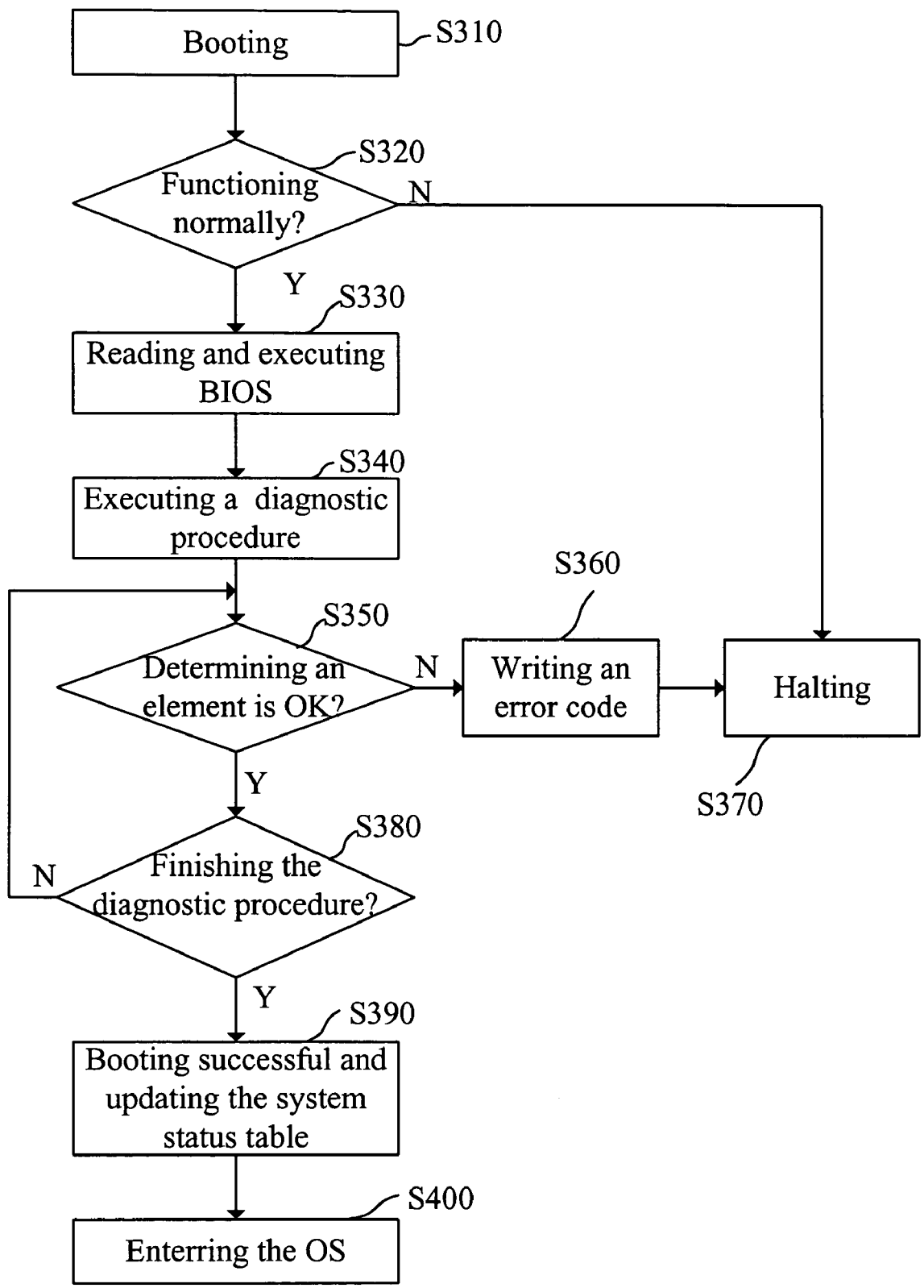
FIG. 3 is a flowchart for a device for automatically detecting and announcing error on booting a motherboard in accordance with the present invention.

Please refer to FIG. 3. FIG. 3 is an operational flowchart of the device for automatically detecting and announcing error on booting a motherboard in accordance with the present invention. In step S310, when a user presses a power button or a reset button to turn on the personal computer, the timer 231 starts to count the elapsed time. In step S320, if the processor 110 is functioning normally, step S330 will be performed. In step S330, the processor 110 reads and executes a command at a predetermined address (such as 0xFFFFFFF0$_H$ or 0x00000000$_H$), and the address is usually mapped to a BIOS. The processor 110 executes setup procedures for the processor, such as setting up the memory management unit (MMU).

In step S340, the processor 110 executes a diagnostic procedure on an element in accordance with the BIOS program code. In step S350, the processor 110 determines if the element has passed the test; if the element passes, step S380 is executed for checking the diagnostic procedure is finished or not; if the element does not pass, step 360 is performed. In step 360, the processor 110 writes a corresponding error code for the element into the system status table 222, and then step 370 is performed. In step S380, the processor checks the diagnostic procedure is finished or not. If the diagnostic procedure is finished, then step S390 is performed, otherwise the step S340 is performed.

As shown in FIG. 4, in the system status table 222, 00 . . . 000B is a predetermined value, which indicates a turned off condition, 10 . . . 000B indicates a normal turned on condition, 00 . . . 001B indicates error 1, 00 . . . 010B indicates error 2, and so forth. For example, when the processor 110 detects that the element 1 cannot function normally, the processor 110 writes a corresponding error code (00 . . . 001B) for the element 1 into the system status table 222. In this design, the system status table 222 only requires a bytes of memory.

In step S370, since there is already one failed element, the processor 110 halts execution. In step S390, the processor writes a corresponding normal turned on condition code 10 . . . 000B for the element 1 into the system status table 222. In step S400, the processor 110 reads from a hard disk to download code for an operating system into memory so the computer can boot the operating system.

When the timer 231 times out, the automatic error detection speech unit 230 reads the system status table 222. In step S320, if the processor 110 is unable to function normally, the system status table 222 will not be updated and a predetermined value 00 . . . 000B stored in the system status table 222 is read by the automatic error detection speech unit 230. The automatic error detection speech unit 230 extracts a speech signal corresponding to the predetermined value 00 . . . 000B from the memory and sends the speech signal to the speaker 240. Therefore, even if the processor 110 does not function normally, the automatic error detection speech unit 230 of the present invention can still inform the user that the processor 110 has failed.

Similarly, when the timer 231 times out and the automatic error detection speech unit 230 reads that the value of the system status table 222 is 00 . . . 001B, the automatic error detection speech unit 230 extracts a speech signal corresponding to the error code 00 . . . 001B from the memory and sends the speech signal to the speaker 240.

In view of the foregoing, the present invention adds the automatic error detection speech unit 230 onto the LPC bus 250 and utilizes the system status table 222 to record the test results of every element on the motherboard, so the automatic error detection speech unit 230 reads the system status table 222 to play corresponding speech signals when the timer times out. Therefore, the present invention can provide the user with error messages even when the processor has failed.

Although the present invention has been explained in relation to its preferred embodiment, it is to be understood that many other possible modifications and variations can be made without departing from the spirit and scope of the invention as hereinafter claimed.

What is claimed is:

1. A device for automatically detecting and announcing error on booting a motherboard, the motherboard having a processor, the device comprising:
   a storage device for storing BIOS program code and a system status table of the motherboard, the BIOS program code being executed by the processor when the motherboard is booting, the system status table of the motherboard storing at least one motherboard element status, the system status table being updated by the processor based on booting the motherboard when the motherboard is turned on; and
   an automatic error detection speech unit coupled to the storage device for reading the system status table of the motherboard after a predetermined time period since the motherboard being turned on, and playing corresponding speech data in accordance with the motherboard element status based on the system status table of the motherboard.

2. The device as claimed in claim 1, wherein the storage device is a non-volatile memory.

3. The device as claimed in claim 1, wherein the system status table for the motherboard pre-stores a setting indicating that the processor has failed so that when the motherboard is turned on and the processor is incapable of functioning correctly to update the system status table the automatic error detection speech unit plays corresponding speech data indicating the processor has failed.

4. The device as claimed in claim 1, wherein the automatic error detection speech unit is coupled to the storage device via a LPC bus of a south-bridge on the motherboard.

5. The device as claimed in claim 4, wherein the automatic error detection speech unit is coupled to the storage device via an I²C bus of a south-bridge on the motherboard.

6. The device as claimed in claim 1, wherein the storage device further stores audio data for a greeting or commercial phrase.

7. A device for automatically detecting and announcing error on booting a motherboard, the motherboard having a processor, the device comprising:

a south-bridge chip connected to and used for managing other peripheral devices of the motherboard;

a storage device for storing BIOS program code and a system status table of the motherboard, the BIOS program code being executed by the processor when the motherboard is turned on, the system status table of the motherboard storing at least one motherboard element status, the system status table being updated by the processor based on booting the motherboard when the motherboard is turned on; and an automatic error detection speech unit coupled to the storage device for reading the system status table of the motherboard after a predetermined time period since the motherboard being turned on and playing corresponding speech data in accordance with the motherboard element status based on the system status table of the motherboard.

8. The device as claimed in claim 7, wherein the storage device is a non-volatile memory.

9. The device as claimed in claim 7, wherein the system status table of the motherboard pre-stores a setting indicating that the processor has failed so that when the motherboard is turned on and the processor is incapable of functioning correctly to update the system status table the automatic error detection speech unit plays corresponding speech data indicating that the processor has failed.

10. The device as claimed in claim 7, wherein the automatic error detection speech unit is coupled to the storage device via a LPC bus of a south-bridge on the motherboard.

11. The device as claimed in claim 7, wherein the automatic error detection speech unit is coupled to the storage device via an I$^2$C bus of a south-bridge on the motherboard.

12. The device as claimed in claim 7, wherein the storage device further stores audio data for a greeting or commercial phrase.

13. A method for automatically detecting and announcing error on booting a motherboard, the motherboard having a processor, a storage device and an automatic error detection speech unit, the storage device which stores BIOS program code and a system status table of the motherboard, the automatic error detection speech unit coupled to the storage device for reading the system status table of the motherboard after a predetermined time period since the motherboard being turned on, the method includes:

(A) booting the motherboard;

(B) determining whether the processor is function normally; and (C) when step (B) determines that the processor is function abnormally, the automatic error detection speech unit plays corresponding speech data in accordance with the motherboard element status based on the system status table of the motherboard.

14. The method as claimed in claim 13, wherein step (B) determines that the processor is function normally, the following steps are executed:

(D) reading executing the BIOS program code;

(E) executing a diagnostic procedure;

(F) determining a diagnostic element is function normally; and (G) when step (F) determines that the diagnostic element is function abnormally, step (C) is executed.

15. The method as claimed in claim 14, wherein step (F) determines that the diagnostic element is function normally, the following steps are executed:

(H) determining whether the diagnostic procedure is finished or not; and (I) when step (H) determines that the diagnostic procedure is not finished, step (F) is executed.

16. The method as claimed in claim 15, wherein step (H) determines that the diagnostic procedure is finished, the following steps are executed:

(J) booting successful and updating the system status table; and (K) enterring an OS.

* * * * *